United States Patent [19]

Kara

[11] Patent Number: 4,462,056
[45] Date of Patent: Jul. 24, 1984

[54] VIDEO TAPE RECORDER CLEANING DEVICE

[76] Inventor: Stephen Kara, 2609 Sapra St., Thousand Oaks, Calif. 91362

[21] Appl. No.: 325,923

[22] Filed: Nov. 30, 1981

[51] Int. Cl.³ .............................................. G11B 5/41
[52] U.S. Cl. ...................................... 360/128; 360/85
[58] Field of Search .................. 360/128, 137, 85, 95, 360/84, 74.6–74.7, 130.22

[56] References Cited

U.S. PATENT DOCUMENTS

| | | | |
|---|---|---|---|
| 4,387,411 | 6/1983 | Clausen et al. | 360/128 |
| 4,388,663 | 6/1983 | Becella | 360/128 |
| 4,408,241 | 10/1983 | Ogawa | 360/128 |

FOREIGN PATENT DOCUMENTS

| | | | |
|---|---|---|---|
| 2301533 | 8/1974 | Fed. Rep. of Germany | 360/128 |
| 56-134316 | 10/1981 | Japan | 360/128 |
| 2066999 | 7/1981 | United Kingdom | 360/128 |
| 2073470 | 10/1981 | United Kingdom | 360/128 |
| 2094539 | 9/1982 | United Kingdom | 360/128 |

*Primary Examiner*—Stuart N. Hecker
*Attorney, Agent, or Firm*—Richard S. Koppel; Michael D. Harris

[57] ABSTRACT

A cassette type cleaning device for a video tape recorder is disclosed in which a cleaning tape is carried on a pair of reels inside the cassette. The cleaning cassette may be inserted into a recorder and the cleaning tape advanced in moving the contact with the recorder heads and tape guides in the manner of a conventional video tape cassette. The cleaning tape has a non-abrasive surface contacting the recorder and is preferably formed from a synthetic suede material having a thickness of no more than about 0.4 mm, with a bristled surface on the side of the tape contacting the recorder heads. An aperture is provided in the side of the cassette housing in alignment with the tape wound about one reel, allowing cleaning fluid to be dispensed through the aperture onto the wound tape to produce an alternating wet and dry pattern, without exposing the tape by opening the cassette access door. In one embodiment the tape has openings at each end which interface with a light source and light sensors in the recorder to terminate operation of the recorder at the end of a cleaning cycle. In another embodiment metallic strips are adhered to and overlie the tape near each end to actuate a turn-off device. The cleaning cassette may also include an extractable tension relief arm which at least partially blocks the movement of a tension sensing mechanism in the recorder, thereby reducing tape drag as the tape is advanced through the recorder.

6 Claims, 12 Drawing Figures

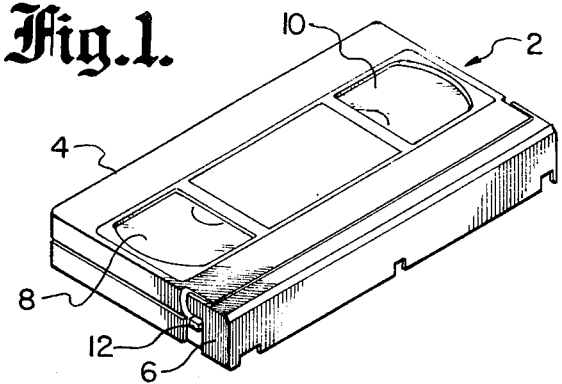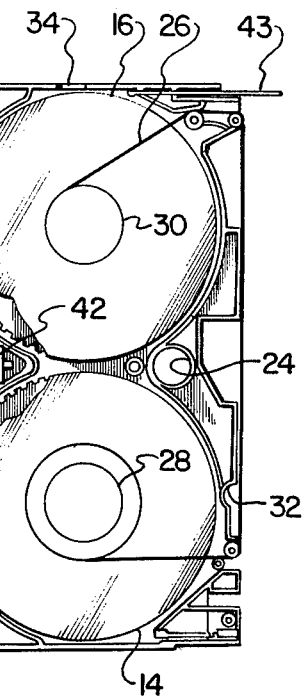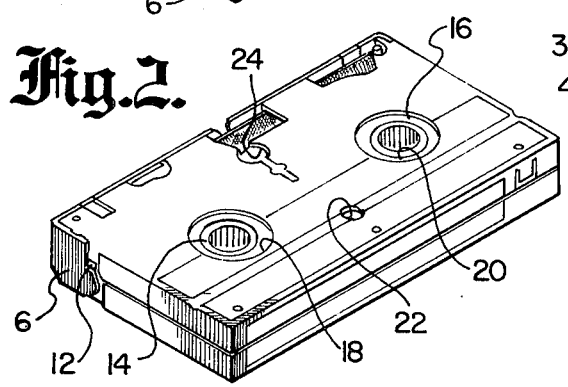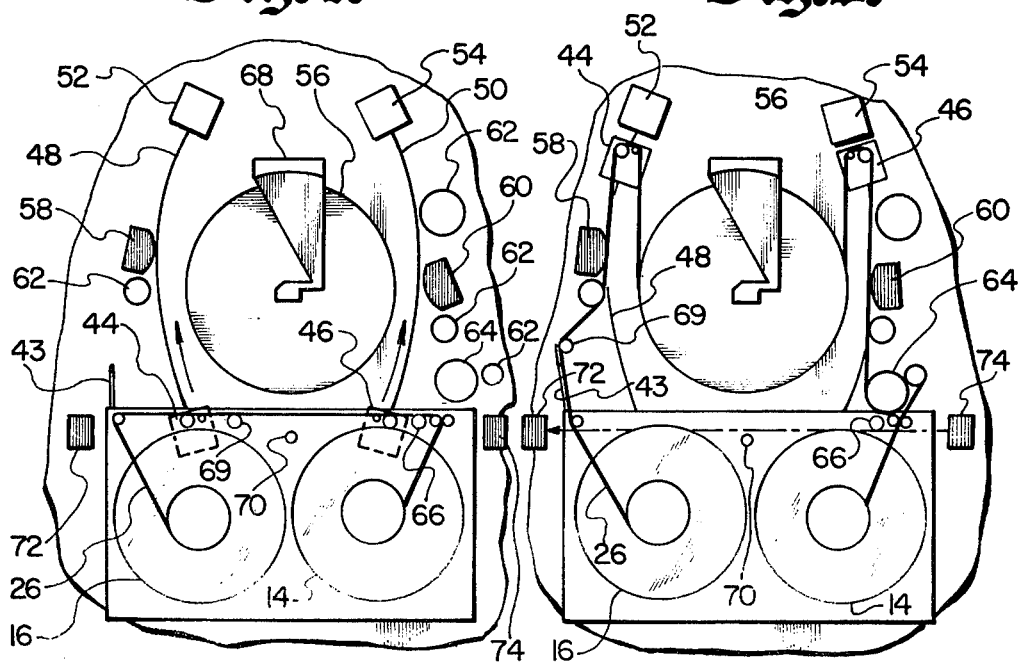

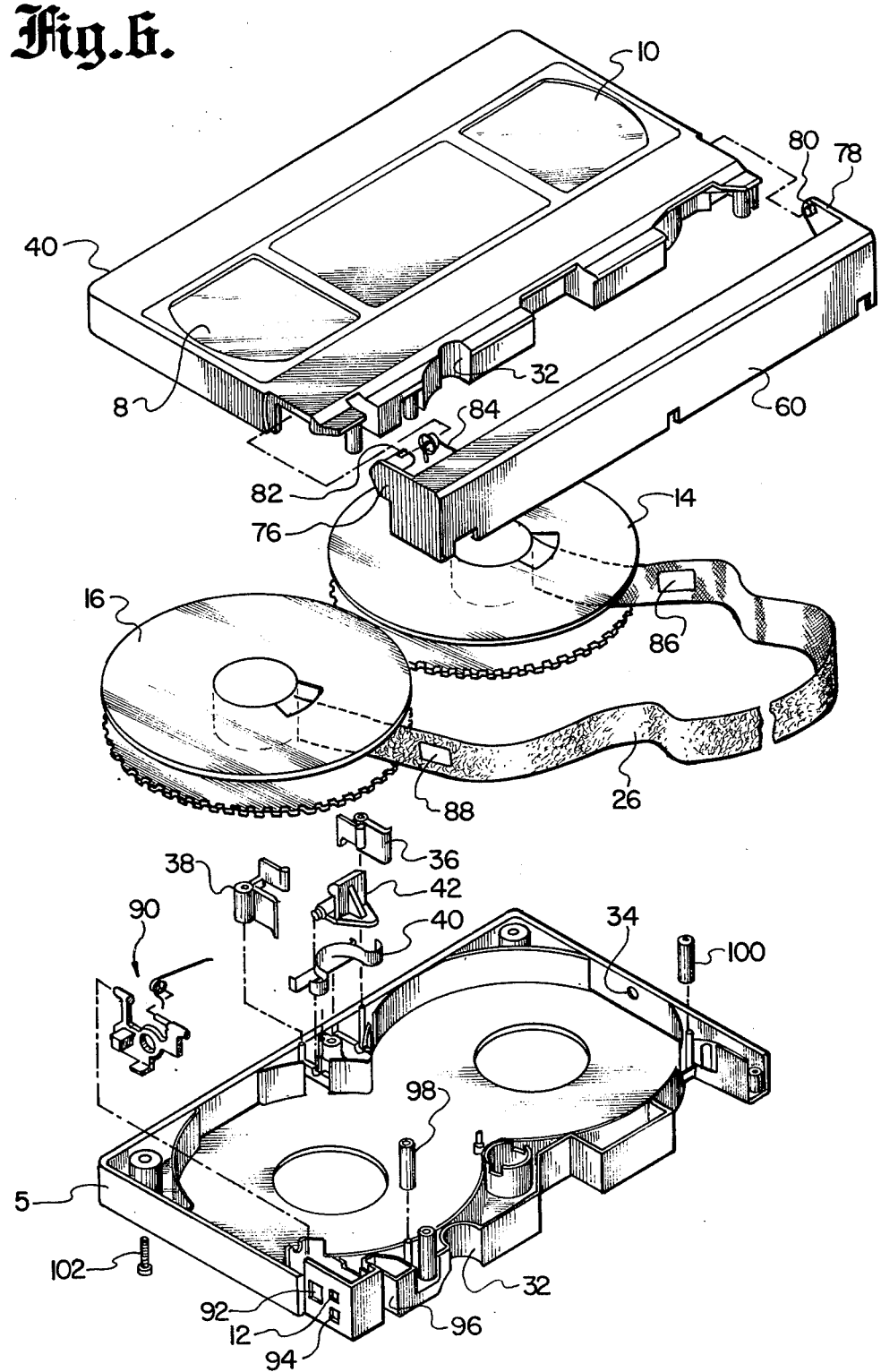

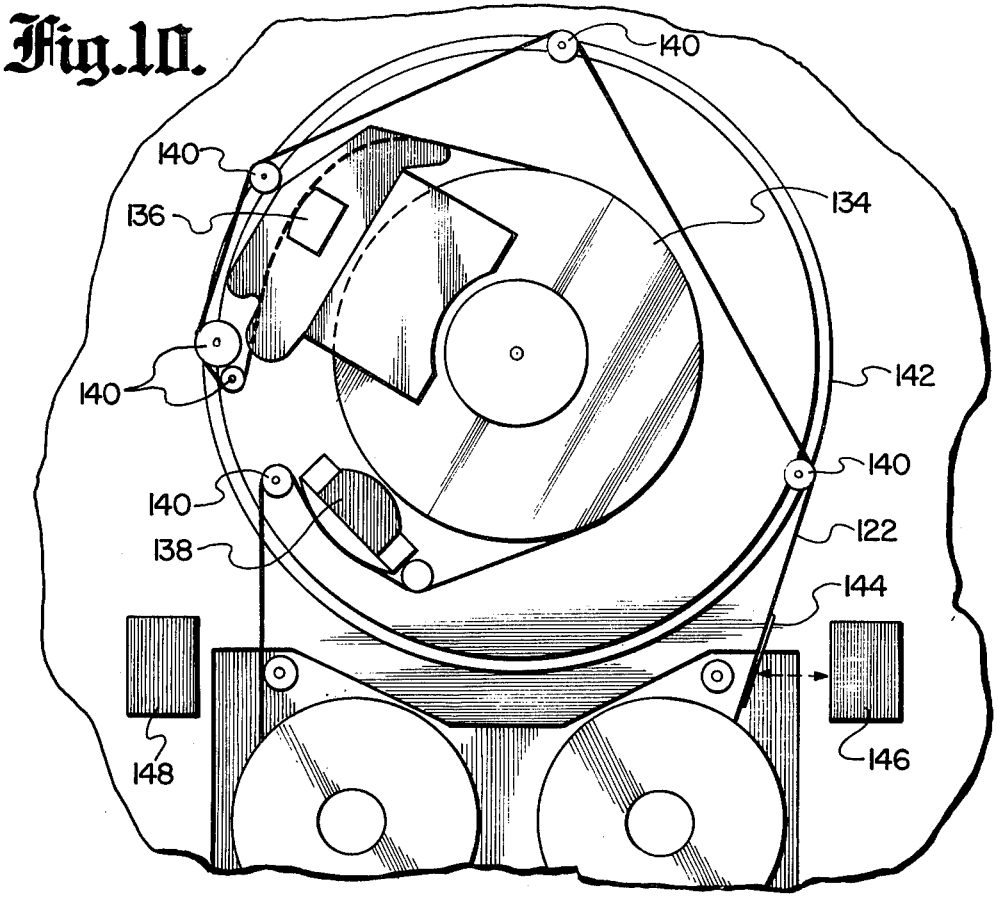
Fig.10.
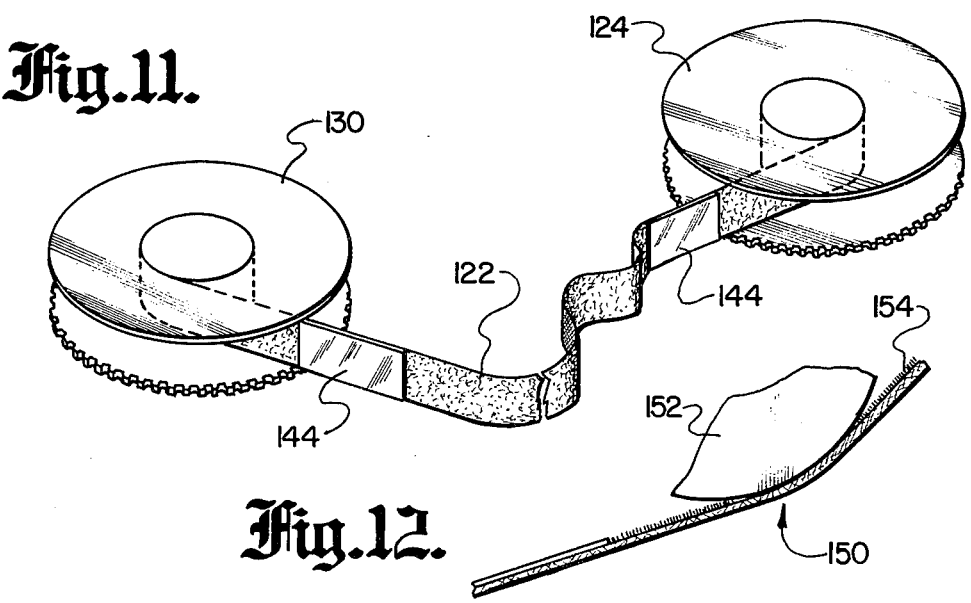
Fig.11.
Fig.12.

VIDEO TAPE RECORDER CLEANING DEVICE

BACKGROUND OF THE INVENTION

1. Field of the Invention

This invention relates to cleaning devices for video tape recorders, and more particularly to cleaning devices which operate on all of the operating heads and tape guides in the recorder tape path.

2. Description of the Prior Art

During normal operation of a video tape recorder, deposits from the video tape can accumulate on the internal recorder elements, causing a fuzzy or "snowy" picture and distorted sound. The picture and sound distortion becomes worse with each successive playback as the deposits continue to accumulate. In an attempt to resolve this problem, several cleaning devices are presently available on the market for cleaning the internal elements of a video tape recorder and restoring a clear picture and good sound quality.

In one popular type of cleaning device an abrasive cleaning tape is packaged in a standard video tape cassette. The cleaning cassette is inserted into the recorder and played indeed the standard manner so that the abrasive tape surface acts against the various internal operating heads and tape guides to remove accumulated deposits. The tape is provided with transparent leaders at each end which permit the completion of a light path between a standard light source and sensors within the recorder, thus signalling the end of the tape and the completion of a full tape pass. A typical cleaning cassette of this type is provided by the 3M Company under the trademark Scotch ®.

While the above type of prior art tape cleaner effectively removes accumulated deposits, their abrasive surfaces can damage the tape heads through excessive use. It is typically recommended that only two to four passes of the tape be made at any time, in order to avoid excessive wear. For example, the 3M Company cleaning casette referred to above provides a specially recorded test message which is displayed on the screen as the cleaning tape is run. The operator monitors the screen to observe when the test message becomes clear, indicating that the heads have been cleaned. At that point he quickly stops the tape so as to avoid excessive wear on the heads. Even with this type of safeguard, however, it is possible to allow the cleaning tape to run for too long and damage the recorder.

Another type of tape cleaner is exemplified by a product produced by Allsop Corporation. This tape cleaner uses a non-abrasive synthetic suede material, thus avoiding the problems of excessive wear inherent in the more common abrasive tapes. The cleaning tape is relatively heavy, being about 0.025 inch (0.635 mm) thick. Rather than running the tape along the normal tape path as with the abrasive cleaners, in the Allsop device the tape is extended so that it wraps only about one-sixth of the circumference of the record/play head, contacts only about the lower fourth of the portion of the head which it does touch, and remains stationary as the head rotates against the tape. While this device does in clean the lower quarter of the record/play head without the wear problem introduced by the abrasive tapes, the cleaning action is not as efficient because of the relatively lesser amount of contact between the cleaning tape and the head. Furthermore, the Allsop device does not clean any of the recorder operating heads or tape guides other than the record/play head and capstan drive. It also lacks a protective door to protect the tape.

The transparent leaders referred to above are added at each end of some conventional abrasive cleaning tapes for use on VHS video tape recorders; for some Beta video tape recorders a flexible metallic conductive leader is attached to each end of the tape to activate the recorder's shut off device. Both the transparent and metallic leaders are subject to breakage, and the make the tapes more difficult to produce in the first place. The Allsop VHS cleaning tape provides an opening toward the end of the tape itself, rather than a transparent leader. However, since the Allsop tape is not run through the recorder but is only extended far enough to make contact with the record/play head and is thereafter retracted, the completion of a light path through the opening in the tape indicates merely the maximum extension of the tape, allowing only a momentary contact between the cleaning tape and the rotating head.

In the Allsop device a portion of the cleaning tape is first moistened with a fluorocarbon cleaning fluid. The fluid is applied to the exposed portion of the tape. Leaving the tape exposed however, makes it possible for dirt to lodge on the tape and for people to foul the tape by handling it.

SUMMARY OF THE INVENTION

In view of the above problems associated with the prior art, it is an object of the present invention to provide a novel and improved cleaning device for a video tape recorder which employs a cleaning medium that does not endanger the recorder elements by the possibility of excessive wear during normal cleaning operations.

It is a further object of the invention to provide a novel and improved cleaning device for a video tape recorder which not only avoids abrasive wear, but also effectively cleans all of the recorder's operating heads, capstan drive and tape guides in the normal tape path.

Another object of the invention is the provision of a novel and improved cleaning device for a video tape recorder which makes it possible to sense the completion of a cleaning tape run without the use of transparent (VHS) or conductive (Beta) leaders employed in prior art cleaning devices.

Still another object of the invention is the provision of a novel and improved cleaning device for a video tape recorder which includes a provision for applying a cleaning fluid to the cleaning tape in an intermittent pattern without having to open the access door of the tape housing, thereby enhancing the cleaning action while keeping the tape clean.

These and other objects of the invention are accomplished by the provision of a video tape recorder cleaning device having a cassette housing which is adapted to be inserted into the recorder in the manner of an ordinary video tape cassette, a pair of tape reels rotatably supported within the housing, and a cleaning tape carried on the reels and adapted to be advanced along the recorder tape path from one reel to the other in moving contact with the recorder's operating heads, capstan drive and tape guides when the cassette is inserted into the recorder and the recorder operated. The cleaning tape is formed from a material having a non-abrasive surface contacting the recorder operating heads, capstan drive and tape guides. The cleaning tape is preferably formed from a synthetic suede material with a bristled surface on one side, having a thickness of no more than about 0.4 mm. A tension arm mechanism is mounted within the housing to relieve tension on the cleaning tape, if necessary, during transit between the tape reels, thereby reducing drag.

The housing has a tape access door which is normally closed, but is opened when the cassette is inserted into a recorder. In order to avoid opening the door to apply a cleaning fluid, a separate opening is provided in the side of the housing in alignment with the cleaning tape. A dispenser can be inserted into the opening to dispense cleaning fluid onto the tape, without exposing the tape by opening the access door. Since the fluid is applied to the tape while it is still wound around a reel, it seeps through successive layers to wet intermittent portions of the tape, resulting in a more effective cleaning action.

In order to provide an indication of when a VHS cleaning tape run has been completed, openings are provided in the cleaning tape near its opposite ends. Each opening is positioned to permit the transmission of light from a light source in the recorder to a sensor at the end of a cleaning cycle, thereby permitting operation of the recorder to be terminated automatically. At all other times the light transmission is blocked by the cleaning tape. The Beta cleaning tape is provided with conductive metallic strips overlying the tape at both ends to close the shut off circuit of the video recorder/player unit.

Further objects and features of the invention will be apparent to those skilled in the art from the following detailed description of preferred embodiments, taken together with the accompanying drawings, in which:

BRIEF DESCRIPTION OF THE DRAWINGS

FIGS. 1 and 2 are respectively top and bottom perspective views of a cleaning cassette designed for use in a VHS-type video tape recorder;

FIG. 3 is a plan view of the reel and tape system of the cleaner shown in FIGS. 1 and 2 with its cover removed;

FIGS. 4 and 5 are plan views illustrating the internal operating mechanism of the cleaning device respectively at initial insertion into a video tape recorder, and with the tape pulled out by the recorder to a cleaning position;

FIG. 6 is an exploded perspective view of the components of the cleaning device;

FIG. 10 is a plan view illustrating the internal operating mechanism of the Beta-type cleaning device after insertion into a video tape recorder with the cleaning tape pulled out to its operating position;

FIG. 11 is a perspective view of the cleaning tape employed in the Beta-type cleaning device; and FIG. 12 is a fragmentary view illustrating the moving contact between the cleaning tape and an operating head of the video tape recorder.

DETAILED DESCRIPTION OF PREFERRED EMBODIMENTS

Figure 7:
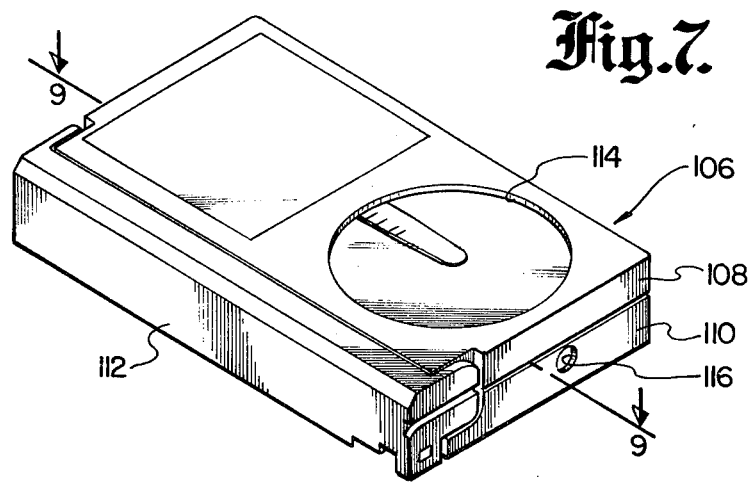
FIGS. 7 and 8 are respectively top and bottom perspective views of a second embodiment of the tape cleaner designed for use with a Beta-type video tape recorder.

Referring first to FIG. 1, a perspective view of the upper side of a video tape recorder cleaning cassette 2 constructed in accordance with the invention is shown. The cassette is designed to be operated in conjunction with a VHS-type video tape recorder, and in general has a conventional construction used by video tape cassettes. A plastic housing 4 encloses the operating elements of the cleaning device, with a spring-biased longitudinal access door 6 pivotally sealing the front end of the housing. Access door 6 is pivoted upward and backward as the cassette is inserted into a video tape recorder, exposing the cleaning tape contained within the housing. Clear plastic panels 8 and 10 provide visibility for the tape reels inside the housing, and may be provided with indicia such as spaced hashmarks to provide an indication of how much tape is on each reel. An opening 12 is provided in the lateral side wall of the housing adjacent the end of access door 6 to provide a light path between a light source and light sensor inside the recorder used to detect the end of the tape. A similar opening is provided in the opposite lateral wall of the housing.

Referring now to FIG. 2, the underside of the tape cleaning cassette is shown. Tape reels 14 and 16 are visible through corresponding circular openings 18 and 20 in the bottom wall of the cassette. Each of the reels 14, 16 is formed with a central bore having axially-aligned knurling around its inner periphery to permit engagement and rotation of the reels by respective drive members in the recorder, in a conventional manner.

The cleaning cassette has an internal tape stop mechanism which is released by a post in the recorder extending through opening 22 in the underside of the cassette to release the tape stops when operation of the cassette is desired. The underside of the cassette also includes an opening 24 through which a light cell in the recorder protrudes during operation of the cleaning device.

Referring now to FIG. 3, the cleaner cassette is shown with the upper side of the housing removed and the internal elements exposed. Tape reels 14 and 16 are held in place by plastic guide walls, and are urged down against the bottom wall of the cassette by a flexible leaf spring mechanism affixed to the top wall of the housing, which is not shown in this figure. A length of cleaning tape 26 has its opposite ends attached to spindles 28, 30 on reels 14, 16 respectively. The tape is wound from one spindle onto the other via a tape path formed by various guideposts and guiding surfaces in the cassette housing, which conform to the tape path found in conventional video tape recorder cassettes. A notch 32 is cut into the front wall of the housing, allowing a pinch roller in the recorder mechanism to be brought into contact with a drive capstan positioned on the opposite sideof the front wall when the cleaning cassette is inserted into the recorder and operated.

It is necessary to wet the cleaning tape with an appropriate cleaning fluid such as a fluorocarbon before the tape is inserted into the recorder. For this purpose the access door could merely be opened to expose the underlying tape, but in so doing the tape might be dirtied or otherwise interfered with by exposure to the atmosphere or by physical handling. In order to prevent this possibility and to keep the tape substantially sealed at all times when it is not inside of the recorder, a small aperture 34 is formed in the side edge wall of the housing transverse to the longitudinal front wall formed by the access door. Aperture 34 is located about halfway between the upper and lower cassette walls in alignment with tape 26, and is just large enough so that a conventional plastic squeeze bottle of a fluorocarbon can be inserted into it when the cassette is stood on end. A few drops are then dropped onto the surface of the cleaning tape. Since the fluid is applied to the portion of the tape which is still wound on the reel, it can seep through several layers of tape in the area immediately below aperature 34. This results in an alternating wet and dry pattern on the tape which enhances its cleaning action, as compared to wetting a single continuous portion of the tape as in the prior art Allsop device.

Cleaning tape 26 itself is formed from a non-abrasive material, preferably synthetic suede. The tape is formed from a "doe" type synthetic suede with a smooth surface on one side and a pattern of upstanding bristles on the opposite side. The cleaning tape is affixed to the reels of the cleaning cassette so that the bristles are on the side of the tape which comes into contact with the recorder heads. The bristles extend into the circumferential grooves normally provided around the periphery of the record/play head, and effect a gentle scrubbing action as the tape is moved past the head. This scrubbing action removes deposits from both the periphery of the head and from its grooves. This provides another advantage over the prior art Allsop device, which employs a tape material with generally smooth surfaces on both sides. Since the cleaning tape is transported through the cassette and makes moving contact with the various recorder/player operating heads, capstan drive and tape guides, tape 26 must be formed from a thinner material than the tape employed in the prior art Allsop cleaner in order to reduce drag and allow free movement of the tape through the recorder. Accordingly, the thickness of tape 26 is no more than about 0.015 inch, or about 0.4 mm. Drag is further relieved by a tension relief arm or pin 43. Arm 43, which extends through openings in plastic wall members in the housing, is normally pushed back into the cassette. If needed, it can be manually extracted before the cassette is inserted into the recorder to reduce the tape tension, as explained below.

The reels are prevented from rotating when the cleaning cassette is outside of the recorder by means of a conventional locking mechanism comprising a pair of locking arms 36, 38 mounted on posts inside the cassette and engaging corresponding detents formed in the periphery of the tape reels. The locking arms are normally biased into a position engaged in detent 36 by a spring 40. When the cassette is inserted into the recorder an arm on the recorder automatically presses up against a release lever 42, which in turn releases locking arms 36 and 38, permitting the reels to rotate under the control of the recorder.

FIG. 4 shows the cleaning cassette as it is first inserted into a typical video tape recorder. The recorder includes a pair of sleds 44, 46, each of which have a pair of upstanding tape guideposts. When the cleaning cassette is inserted into the recorder the sleds are moved so that their guideposts are positioned immediately behind the tape and ready to move the tape out of the cassette housing. Sleds 44, 46 move along respective tracks 48, 50 to extract the tape from the cassette. The opposite ends of the tracks are defined by sled stops 52, 54.

The principle operating heads of the recorder consist of a large central record/play head 56, an erase head 58 adjacent sled track 48, and an audio head 60 adjacent sled track 50. Various guide rollers 62 are positioned to guide the tape along the tape path, while a pinch roller 64 opposite the outer surface of tape 26 is positioned to move against a drive capstan 66 located immediately adjacent the inner tape surface. Audio head 56 is grounded by a grounding plate 68 which makes contact with the head above its access of rotation. A tension sensing mechanism 69 is normally positioned as shown in FIG. 4, and moves to the position shown in dashed lines in FIG. 5 when the cassette is inserted to sense the tape tension. With arm 43 extracted into the path of guide roller 69 as shown in FIG. 5, tension sensor 69 strikes the arm and its movement is limited to the position shown in solid line. This reduces the tension on the tape and helps prevent the tape from hanging up.

A light source 70 in the recorder protrudes through opening 24 in the cassette housing (shown in FIG. 2). The recorder also includes light sensing photocells 72 and 74 adjacent the opposite sides of the cassette in alignment with light source 70. The light source and photocells are used to detect when the end of the tape has been reached, and in response thereto generate a signal which terminates operation of the recorder. Instead of attaching separate transparent leaders to each end of the tape, as is the practice with conventional cleaning cassettes which move a cleaning tape along the normal recorder tape path, tape 26 merely has a pair of openings respectively formed near the opposite ends of the tape. The transmission of light between light source 70 and sensors 72, 74 is blocked except when the tape is advanced almost to its end and one of the openings is brought into alignment between the light source and one of the sensors, thereby permitting light from the source to reach the sensor and produce a signal to terminate rotation of the tape reels. The tape openings, identified by reference numerals 86, 88, are shown in FIG. 6.

FIG. 5 illustrates the cleaning cassette inserted in a video tape recorder in the midst of a cleaning operation. Sled 44 has moved along sled track 48 to stop 52, extending the cleaning tape to the position shown in which it makes contact with erase head 58 and reaches beyond record/play head 56. Sled 46 has similarly moved along sled track 50 to stop 54, from which position the cleaning tape makes contact with audio head 60 and reaches beyond the opposite side of record/play head 56. The cleaning tape is wrapped around fully half of the periphery of the record/play head, and establishes a good cleaning contact with that element. Pinch roller 64 has also moved against drive capstan 66, the rotation of which advances the cleaning tape at a controlled rate. The tape thus makes moving contact with each of the operating heads of the recorder and also with the various tape guides in the tape path, and effectively removes accumulated deposits on these elements. Tension relief arm 43 contacts guide roller 69 below the tape level to avoid any interference with the tape.

Some of the structural features of the cleaning cassette that are not shown in FIGS. 1–5 are illustrated in the exploded perspective view of FIG. 6. Access door 6 is provided at each end with flanges 76, 78 for engagement with the cover of cassette housing 4. Flange 78 has a pin 80 at its end which is seated in a corresponding opening in the housing cover, while flange 76 is provided with a notched pin 82 at its end upon which a spring 84 is mounted to normally bias the access door closed. Tape 26 is shown fully extended from each of its reels 14, 16 so that openings 86 and 88 near each end of the tape can be seen. It will recalled that when the tape has reached one end of a run one of the openings 86, 88 will be aligned between the recorder's light source and a photocell detector, permitting the completion of a light transmission between the two elements to terminate movement of the tape.

Referring now to the lower portion of FIG. 6, a conventional spring-biased access door release element 90 is shown separated from a pair of tabs 92, 94 which actuate the door release lever. A slot 96 is formed in the front wall of the housing to allow access for an arm on the recorder which automatically opens the access door when the cassette is inserted into the recorder.

Various guide rollers 98, 100 are illustrated as being mounted on corresponding mounting pins to guide the cleaning tape in a conventional tape path. A screw 102 is shown which holds the two halves of the cassette housing together when the unit is assembled; other screws (not shown) are used at the remaining three corners of the cassette. Finally, a cleaning fluid dispenser 104 is shown in alignment with aperture 34 to illustrate how the dispenser can be inserted into the aperture to apply cleaning fluid to the tape without having to open access door 6 and risk exposing the tape to the elements.

In operation, a few drops of cleaning fluid are dropped onto the cleaning tape through aperture 34 to wet alternating portions of the tape. The cassette is then inserted into the video tape recorder, which operates in a conventional manner to extract the tape from the retracted position shown in FIG. 4 to the extended position shown in FIG. 5. At the same time pinch roller 64 is pressed against drive capstan 66 to advance the tape in moving contact with the audio head 58, record/play head 56, erase head 60 and the various tape guides. The recorder also rotates reels 14 and 16 in synchronism so that tape is fed from one reel and wound up on the other reel at the proper rate. The tape thus establishes a good moving contact with all of these elements and effectively cleans them without the risk of excessive wear present with abrasive-type cleaning tapes.

Referring now to FIG. 7, another embodiment of the invention designed for use in a Beta-type video tape recorder is shown. The cleaning apparatus is contained in a cassette type housing 106 of conventional configuration. The housing has upper and lower halves 108, 110, and a pivotable access door 112 which is normally closed but automatically opened upon insertion into a tape recorder, as in the VHS device. The cleaning tape is normally wound on a reel located immediately below transparent window 114 formed in the upper housing section. An aperture 116 is formed in the lateral side wall of lower housing section 110 in alignment with the reel under window 114. This permits cleaning fluid to be applied to alternating wet and dry sections of the tape wound about the reel, as in the VHS embodiment.

Figure 8:
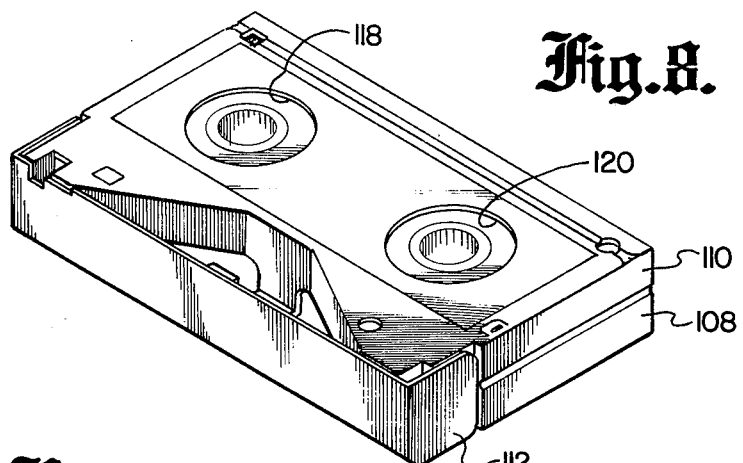

FIG. 8 shows the underside of the Beta cleaning cassette. Circular openings 118 and 120 are provided in housing section 110 to permit access to the tape reels by the recorder transport mechanism.

Figure 9:
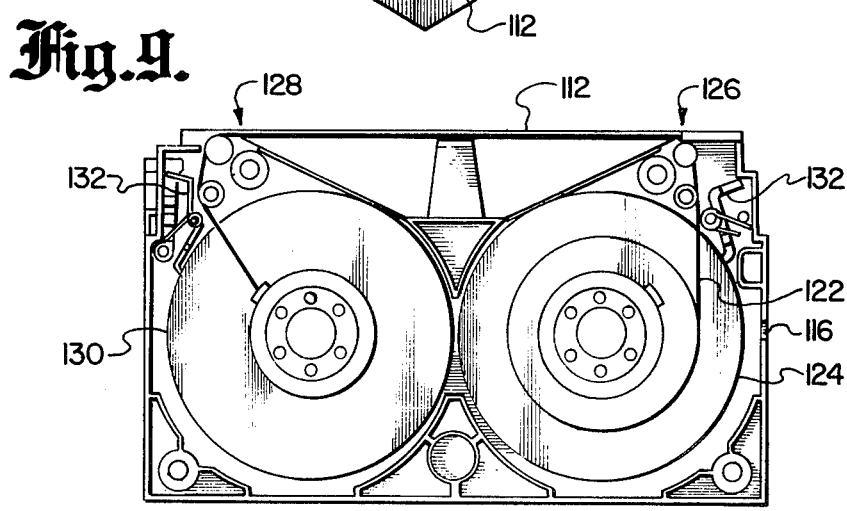
FIG. 9 is a view taken along the lines 9—9 of FIG. 7.

FIG. 9 shows the internal structure of the cleaning cassette before it is inserted into a recorder. The cleaning tape 122 is normally wound around right hand reel 124 and is guided by right and left hand sets of tape guides 126, 128 to left hand reel 130. The cassette includes a conventional spring mechanism 132 for keeping the access door 112 closed when the cassette is not inserted in a recorder.

FIG. 10 shows the cleaning cassette inserted in a Beta type video type recorder with cleaning tape 122 pulled out from the cassette in an operating position to clean the recorder heads. The recorder includes a record/play head 134, audio head 136 and erase head 138. The various heads and a series of tape guides 140 are rotatable about a track 142, permitting the cleaning tape to be engaged by the tape guides and pulled out from the cleaning cassette when the recorder is operated.

Cleaning tape 122 includes a flexible metallic strip 144 near each end. The strips overlie the tape and are preferably adhered to the tape by heat sealing, in contrast to prior art devices in which the metallic leaders are added at the end of the tape. Metal detectors 146, 148 stationed in the recorder sense the presence of a metallic section 144 as the tape becomes completely wound about one reel or the other. Sensors 146, 148 function in a conventional manner to produce a signal which terminates the tape drive mechanism when a metallic section is detected. Movement of the tape past the various heads is controlled by a capstan/pinch wheel mechanism (not shown) as in the VHS embodiment. The tape employed in the Beta embodiment is shown isolated from the remainder of the cleaning cassette in FIG. 11.

Referring now to FIG. 12, an enlarged view of a section of the cleaning tape 150 employed in both the VHS and Beta embodiments is shown in contact with one of the recorder heads 152. One side of the tape is relatively smooth, while the other side has bristles 154 which extend into the head grooves and scrub the head as described above.

While two embodiments of the invention are described above, various modifications and alternate embodiments will occur to those skilled in the art. Accordingly, it is intended that the invention be limited only in terms of the appended claims.

I claim:

1. A cleaning device for a video tape recorder of the type adapted to move a video tape between two reels along a predetermined path in moving contact with a plurality of operating heads and tape guides, at least some of said heads including a plurality of circumferential grooves, said device comprising:
   a cassette housing adapted to be inserted into the recorder in the manner of a video tape cassette,
   a pair of tape reels rotatably supported within the housing, and
   a cleaning tape carried on said reels and adapted to be advanced along the recorder tape path from one reel to the other in moving contact with the operating heads and tape guides when the cassette housing is inserted into the recorder and the recorder operated, said cleaning tape having a non-abrasive surface contacting the recorder operating heads and tape guides, said non-abrasive surface including an array of bristles adapted to extend into the head grooves and effect a scrubbing action to remove deposits from both the periphery of the heads and from their grooves as the tape is advanced.

2. The video tape recorder cleaning device of claim 1, said cleaning tape having a thickness of no more than about 0.4 mm.

3. The video tape recorder cleaning device of claim 1 or 2, said cleaning tape being formed from a synthetic suede material.

4. The video tape recorder cleaning device of claim 1 or 2, adapted to be used with a video tape recorder of the type having a light source and light sensor means positioned to sense the presence of a transparent section indicating the end of a tape and to terminate operation of the recorder when the transparent section is sensed, wherein open portions are provided in the cleaning tape near its opposite ends, said open portions being positioned to permit the transmission of light from the light source to a sensor at the end of a cleaning cycle to terminate the operation of the recorder, said transmission otherwise being blocked by the cleaning tape.

5. The video tape recorder cleaning device of claim 1 or 2, further comprising a tension relief arm mounted within the housing, said arm being manually extractable from the housing to a cantilevered position at least partially blocking the movement of a tension sensing mechanism in the recorder, and thereby reducing tape drag as the tape is advanced through the recorder, said drum also being capable of remaining in a retracted non-blocking position during operation of the cleaning device.

6. The video tape recorder cleaning device of claim 1, adapted for a video tape recorder of the type which includes a light source and light sensor means positioned on opposite sides of the tape path so that light from the light source is received by a sensor only at the end of a reel when a transparent portion of the tape is located between said source and sensor, the sensors functioning to terminate movement of the tape upon sensing light from the source, said cleaning tape including open portions adjacent its opposite ends and positioned to enable the transmission of light from the light source to a sensor at the end of a cleaning cycle to terminate operation of the recorder, said light transmission otherwise being blocked by the cleaning tape.

* * * * *